(12) United States Patent
Yoshikata et al.

(10) Patent No.: US 7,517,601 B2
(45) Date of Patent: Apr. 14, 2009

(54) SOLID OXIDE FUEL CELL

(75) Inventors: Kuniaki Yoshikata, Tokyo-to (JP);
Hirotoshi Sakamoto, Tokyo-to (JP);
Koichi Mikami, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 560 days.

(21) Appl. No.: 10/730,013

(22) Filed: Dec. 9, 2003

(65) Prior Publication Data
US 2004/0197628 A1  Oct. 7, 2004

(30) Foreign Application Priority Data
Dec. 9, 2002 (JP) .............................. 2002-356782
Nov. 12, 2003 (JP) .............................. 2003-383184

(51) Int. Cl.
*H01M 8/10* (2006.01)
*H01M 8/24* (2006.01)

(52) U.S. Cl. ........................................ 429/30; 429/127
(58) Field of Classification Search .................. 429/30, 429/127
See application file for complete search history.

(56) References Cited

U.S. PATENT DOCUMENTS

| | | | |
|---|---|---|---|
| 6,936,366 B2 * | 8/2005 | Kearl et al. ................... | 429/30 |
| 7,081,317 B2 * | 7/2006 | Fujii et al. ..................... | 429/40 |
| 7,122,264 B2 * | 10/2006 | Nishi et al. ................... | 429/30 |
| 7,122,265 B2 * | 10/2006 | Kushibiki et al. ............. | 429/30 |

FOREIGN PATENT DOCUMENTS

| | | |
|---|---|---|
| JP | 05-3045 | 1/1993 |
| JP | 05-94830 | 4/1993 |
| JP | 08-264195 | 10/1996 |
| JP | 2000-243412 | 9/2000 |
| JP | 2002-280015 | 9/2002 |
| JP | 2002-280017 | 9/2002 |
| JP | 2003-51319 | 2/2003 |
| WO | WO 02/080299 A1 * | 10/2002 |

OTHER PUBLICATIONS

T. Hibino et al. / Journal of The Electrochemical Society, 149(2) A195-A200 (2002) / A Solid Oxide Fuel Cell with a Novel Geometry That Eliminates the Need for Preparing a Thin Electrolyte Film.
T. Hibino et al. / Journal of The Electrochemical Society, 148(6) A544-A549 (2001) / A Solid Oxide Fuel Cell Using an Exothermic Reaction as the Heat Source.
T. Hibino et al. / Journal of The Electrochemical Society, 149(2) A133-A136 (2002) / High Performance Anodes for SOFCs Operating in Methane-Air Mixture at Reduced Temperatures.
T. Hibino et al. / Science vol. 288 Jun. 16, 2000 2031 / A Low-Operatiing-Temperature Solid Oxide Fuel Cell in Hydrocarbon-Air Mixtures.

* cited by examiner

*Primary Examiner*—Tracy Dove
(74) *Attorney, Agent, or Firm*—Kratz, Quintos & Hanson, LLP

(57) ABSTRACT

A fuel cell including at least one single cell C having an electrolyte 3, a fuel electrode 5, and an air electrode 7, wherein the single cell C is supported on a substrate 1 and the electrolyte 3 is disposed on a first surface of the substrate 1, with the fuel electrode 5 and the air electrode 7 disposed on the first surface of the substrate 1 so as to sandwich the electrolyte 3.

13 Claims, 10 Drawing Sheets (a)

(b)

(a)

(b)

(c)

(a)

(b)

(a)

(b)

(c)

(a)

(b)

(c)

(a)

(b)

SOLID OXIDE FUEL CELL

BACKGROUND OF THE INVENTION

1. Field of the Invention

The present invention relates to a fuel cell, specifically, to a fuel cell that stably generates electricity mainly in a mixed gas of fuel gas and air.

2. Description of the Related Art

Planar type (stack-type), tubular type (tube-type) and other types of cell designs have been conventionally proposed for fuel cells.

As disclosed in Japanese Unexamined Patent Publication No. 1993-3045, a planar type cell comprises a fuel electrode and an air electrode disposed on the front and back surfaces, respectively, of a flat electrolyte. The thus formed cells are used in a condition where a plurality of cells are laminated having a separator between adjacent cells. The separator completely separates the fuel gas supplied to each cell from the air, and a gas seal is provided between each cell and separator. However, in this planar type cell, because the gas seal is provided by applying pressure to the constituent components of the cell, the cell is easily damaged by oscillation, heat cycles, etc. This poses a significant problem in bringing the fuel cell to practical use.

In contrast, the tubular type cell disclosed in, for example, Japanese Unexamined Patent Publication No. 1993-94830, comprises a fuel electrode and an air electrode disposed on the outer surface and inner surface, respectively, of the cylindrical electrolyte. Among tubular type cells, vertical-stripe-type and horizontal-stripe-type fuel cells have been proposed. Although a tubular type fuel cell is advantageous in having excellent gas-sealing properties, its manufacturing process is complicated because its construction is more complex than that of a planar type cell and this makes the manufacturing cost thereof high.

Furthermore, these cell designs have the following drawbacks: Both in planar type cells and tubular type cells, the electrolyte needs to be made thin to improve their performance, and the ohmic resistance of the electrolyte material needs to be reduced. However, unduly thin electrolyte lacks sufficient strength and decreases the vibration resistance and durability of the cell.

For this reason, a non-diaphragm-type solid oxide fuel cell has been proposed to take the place of the above-mentioned planar type and tubular type fuel cells, wherein, as disclosed in, for example, Japanese Unexamined Patent Publication No. 1996-264195, a fuel electrode and an air electrode are arranged on the same surface of a substrate formed of a solid electrolyte, and electricity is generated by supplying a mixed gas of fuel and air thereto to conduct ions mainly on the surface of the electrolyte. Because fuel and air do not need to be separated in this fuel cell, the separator and gas seal become unnecessary, and the construction thereof can be significantly simplified.

As described above, in the fuel cell disclosed in Japanese Unexamined Patent Publication No. 1996-264195, an electrolyte is used as a substrate and a plurality of fuel electrodes and air electrodes are disposed on a single surface thereof. However, because, in the electrolyte, the portion necessary for cell reaction is in the vicinity of the electrodes, there are many portions that do not contribute to the cell reaction in the electrolyte used as the substrate. Because the materials for electrolytes are not inexpensive, when portions exist that do not contribute to the cell reaction, the cost performance is undesirably lowered.

The present invention aims to solve the above problems, and to provide a fuel cell that is capable of improving cost performance without lowering its cell performance.

SUMMARY OF THE INVENTION

The first embodiment aims to solve the above problems and provides a fuel cell comprising at least one single cell having an electrolyte, a fuel electrode, and an air electrode, wherein the fuel cell is provided with substrate that supports the single cell, the electrolyte is disposed on one surface of the substrate, and the fuel electrode and air electrode air disposed on one surface of the substrate sandwiching the electroyte in between them.

In this structure, by disposing the electrolyte on the substrate and adjacently disposing the fuel electrode and the air electrode on either side of the electrolyte so as to sandwich the electrolyte, a single cell is formed. This makes it possible to compose a single cell that uses the minimal amount of electrolyte necessary for a cell reaction, thus improving cost performance.

Furthermore, because the electrolyte, fuel electrode, and air electrode are supported by the substrate, excellent durability can be maintained, and by narrowing the width of the electrolyte, high output (electric power) can be obtained. In conventional fuel cells, electricity is generated using only ionic conduction around the surface of the electrolyte. However, in the present invention, because the electrolyte is sandwiched between the fuel electrode and the air electrode, ionic conduction inside the electrolyte can be used in addition to that around the surface of the electrolyte, and this further enhances the electric power.

In the above-described fuel cell, the height of the electrolyte, fuel electrode, and air electrode can be the same, as measured from the surface of substrate, or it is possible to make the height of the fuel electrode and/or air electrode greater than the height of the electrolyte as measured from the surface of the substrate. This makes it possible to improve both the ionic conduction around the surface of the electrolyte and that inside the electrolyte.

When the heights of the fuel electrode and air electrode are made greater than that of the electrolyte, as measured from the surface of substrate, it is preferable that the fuel electrode and air electrode be disposed on top of the electrolyte in such a manner that they are separated from each other in one portion thereof. In this structure, ionic conduction around the upper surface of the electrolyte is further enhanced by the fuel electrode and the air electrode disposed on the upper surface of the electrolyte, and therefore greater electric power can be obtained.

In the above-described fuel cell, a single cell is disposed on one surface of the substrate; however, it is also possible to dispose a single cell on the other surface of the substrate. In other words, in addition to disposing a single cell on one surface of the substrate, at least one single cell can be disposed on the other surface. The electrolyte of the single cell can be disposed on the other surface of the substrate, and the fuel electrode and air electrode can be disposed on either side of the electrolyte on the other surface of the substrate, sandwiching the electrolyte in between them. This makes it possible to form a plurality of single cells having the above structure on the same substrate, therefore enabling high electric power to be obtained while keeping the fuel cell compact.

A plurality of single cells disposed on the substrate as described above can also be connected by interconnectors. This structure makes it possible to form many fuel electrodes and air electrodes on the same substrate, and enables greater electric power to be obtained. In this case, a plurality of single cells can be connected in series, in parallel, or in a condition wherein both serial and parallel connections are used.

In particular, when single cells are connected in series, the following effects can be achieved. For example, in a conventional example, because a plurality of electrode units each composed of a fuel electrode and an air electrode are disposed on one electrolyte, a cancellation of electromotive force occurs in the electrolyte between the electrode units. In contrast, in the present invention, because the electrolyte exists only inside a single cell and not between two adjacent single cells, even when a plurality of single cells are connected in series, there is no cancellation of electromotive force and high electric power can be obtained.

In the above-described fuel cell, it is preferable that the width of the electrolyte in the direction in which it is being sandwiched between the fuel electrode and the air electrode be 10-500 µm. This makes it possible to obtain high electric power.

The second invention aims to solve the above problem and provides a fuel cell comprising at least one single cell having an electrolyte, a fuel electrode, and an air electrode; wherein the fuel cell is provided with a substrate that supports the single cell, the electrolyte is disposed on one surface of the substrate, and only one of the fuel and air electrodes is disposed on the electrolyte, while the other electrode is not in contact with the electrode that is disposed on the electrolyte and is in contact with the electrolyte by having at least one portion disposed on one surface of the substrate.

In this fuel cell, one of the electrodes is disposed on the electrolyte of the substrate, and the other electrode is disposed on the substrate in contact with the electrolyte. This structure makes it possible to compose a single cell using minimal excess electrolyte, meaning electrolyte that is unnecessary for a cell reaction, thus improving cost performance. Furthermore, in this fuel cell, ionic conduction occurs not only on the surface of the electrolyte but also inside the electrolyte, which allows greater electric power to be obtained.

It is also possible to dispose the other electrode on a portion of the electrolyte in this manner as long as the two electrodes can be kept apart from each other. When the other electrode is disposed on the substrate, it is possible to separate the two electrodes from each other by simply adjusting the thickness of the other electrode. In other words, when the thickness of the other electrode is made to be thinner than that of the electrolyte, the two electrodes will be separated from each other, and therefore even when the fuel cell is miniaturized, the distance between the two electrodes can be readily adjusted. Furthermore, by adjusting the thickness of the electrode, the distance between the electrodes can be easily shortened.

It is also possible to arrange a plurality of single cells having such a structure and to connect them by interconnectors. This structure makes it possible to form many fuel electrodes and air electrodes on the same substrate, and therefore to obtain greater electric current and higher voltage. In this case, the plurality of single cells can be connected in series, in parallel, or in a condition wherein both serial and parallel connections are used. In particular, when the single cells are connected in series, similar to the fuel cell of the first invention, there is no cancellation of electromotive force and a high voltage can be obtained.

In the above-described fuel cell, it is preferable that the electrolyte, fuel electrode, and air electrode be formed by a printing method. This makes it possible to accurately adjust the thickness and dimensions thereof, as well as the distance between the two electrodes. Furthermore, this makes it possible to optionally form an electrolyte in a portion necessary for the cell reaction and to reduce the amount of the electrolyte used to a minimal range, resulting in further cost reduction.

In the above-described fuel cell, single cells are disposed on one surface of the substrate; however, it is also possible to dispose them on the other surface of the substrate. In other words, in addition to disposing a single cell one surface of the substrate, at least one single cell is disposed on the other surface, wherein the electrolyte of this single cell is disposed on the other surface of the substrate and either the fuel electrode or the air electrode is disposed on this electrolyte in a condition such that the two electrodes are separated from each other and at least one portion thereof is disposed on the substrate in contact with the electrolyte. This structure allows many single cells to be formed on the same substrate, which makes it possible to obtain high electric power while keeping the fuel cell compact.

From the viewpoint of thermal resistance, it is preferable that the substrate used in the fuel cell be composed of ceramic material which has no electrical conductivity.

BEST MODE FOR CARRYING OUT THE INVENTION

Figure 1:
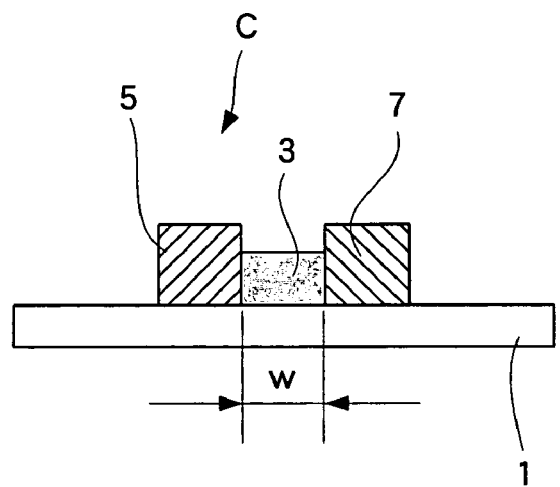
FIG. 1 shows a fuel cell of the first embodiment of the present invention, wherein (a) is a sectional view and (b) is a plan view thereof.
Figure 1:
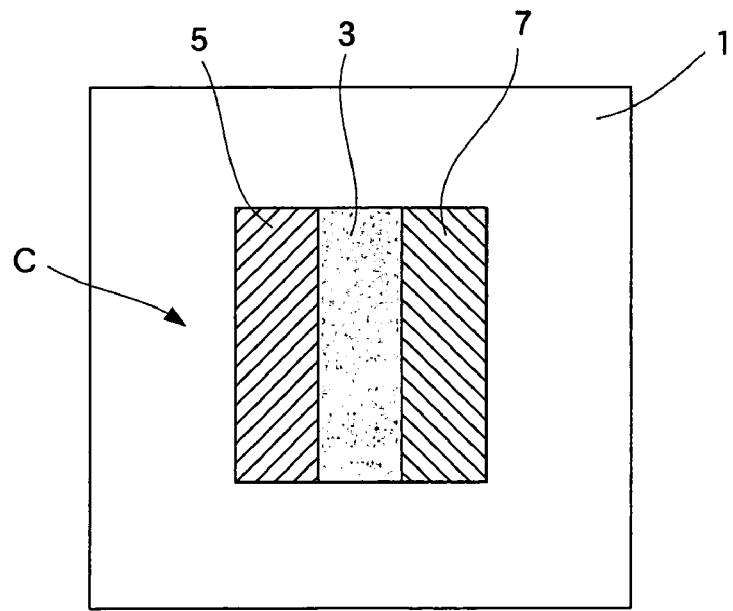

Hereafter, the first embodiment, wherein the fuel cell of the present invention is employed for a solid oxide fuel cell, is explained with reference to the accompanying drawings. FIG. 1 shows the fuel cell of the first embodiment of the present invention, wherein (a) is a sectional view and (b) is a plan view thereof.

As shown in FIG. 1, this fuel cell comprises a single cell C having an electrolyte 3, a fuel electrode 5, and an air electrode 7, wherein the single cell C is supported by a substrate 1.

The single cell C has a structure as described below. The electrolyte 3 is formed into a strip-like shape on top of the substrate 1 (one side), and the strip-like fuel electrode 5 and the air electrode 7 are adjacently disposed so as to sandwich the electrolyte 3 between them. It is preferable that the heights of both the fuel electrode 3 and the air electrode 5 as measured from the surface of the substrate 1 be greater than that of the electrolyte 3 as measured from the surface of the substrate 1. This improves ionic conduction both in the vicinity of the surface of the electrolyte 3 and inside the electrolyte, which allows greater electric power to be obtained. Note that it is preferable that the heights of the electrolyte 3, the fuel electrode 5, and the air electrode 7 be 1-1000 μm.

It is preferable that the width w of the electrolyte 3 in the direction in which it is being sandwiched between the fuel electrode 5 and the air electrode 7 be as small as possible to obtain an improved efficiency in electricity generation. This is because when width w is too large, the efficiency in electricity generation tends to be reduced because the internal resistance of the electrolyte becomes greater. From this point of view, the upper limit on width w is preferably 1000 μm or less, more preferably 500 μm or less, and most preferably 200 μm or less. However, if the width w is too small, it becomes difficult to form a cell efficiently and prevent a short circuit caused by the fuel electrode and the air electrode coming into contact with each other, and therefore it is preferable that the lower limit for the width w be not smaller than 1 μm, and more preferably not smaller than 10 μm.

Materials composing the above-described fuel cell are explained below. It is preferable that the substrate 1 be made of a material that has excellent adhesiveness to the electrolyte 3, the fuel electrode 5 and the air electrode 7, is resistant to temperatures of at least 1500° C., and has no electrical conductivity. Specifically, alumina-based materials, silica-based materials, titanium-based materials, and like ceramic-based materials are preferable. The thickness of the substrate 1 is not limited; however, about 50 μm-50 mm can be exemplified as a preferable range from the standpoint of strength and cost.

Known materials for electrolytes for use in a solid oxide fuel cell can be used as materials for the electrolyte 3. Examples of such materials include $(Ce, Sm)O_3$, $(Ce, Gd)O_3$, and like ceria-based materials; $(La, Sr)(Ga, Mg)O_3$, and like lanthanum or gallate-based materials; scandium stabilized zirconia (ScSz), yttrium stabilized zirconia (YSZ), and like zirconia-based oxygen ion conductive ceramic materials.

The fuel electrode 5 and the air electrode 7 can be formed of ceramic powder. The average particle size of the ceramic powder is generally from 10 nm to 100 μm, preferably from 50 nm to 50 μm, and more preferably from 100 nm to 10 μm. The average particle size can be measured, for example, in accordance with JISZ8901.

Examples of ceramic powder materials forming the fuel electrode 5 include mixtures of nickel and oxygen ion conductive ceramic materials. Examples of usable oxygen ion conductive ceramic materials include $(Ce, Sm)O_3$, $(Ce, Gd)O_3$, and like ceria-based materials; $(La, Sr)(Ga, Mg)O_3$ and like lanthanum or gallate-based materials; scandium stabilized zirconia (ScSz), yttria stabilized zirconia (YSZ), and like ceramic materials. It is preferable that the fuel electrode 5 be formed of a mixture of these ceramic materials and nickel. Among these, it is the most preferable that the fuel electrode 5 be formed of cermets of nickel-ceria-based oxide. The form of the mixture of oxygen ion conductive ceramic materials and nickel may be a physical mixed form, or a form wherein nickel oxide is subjected to powder modification with an electrolyte material. The above-mentioned ceramic materials can be used alone or in a combination of two or more members. Ceramic materials for the air electrode 7 include, for example, perovskite-base metal oxides. Specific examples thereof include $(Sm, Sr) CoO_3$, $(La, Sr) MnO_3$, $(La, Sr) CoO_3$, $(La, Sr)(Fe, Co)O_3$, $(La, Sr)(Fe, Co, Ni)O_3$, etc. These ceramic materials may be used alone or in a combination of two or more members.

The electrolyte 3, the fuel electrode 5, and the air electrode 7 are formed by using the above materials as main ingredients and adding appropriate amounts of varnish, organic solvent, etc.

Figure 2:
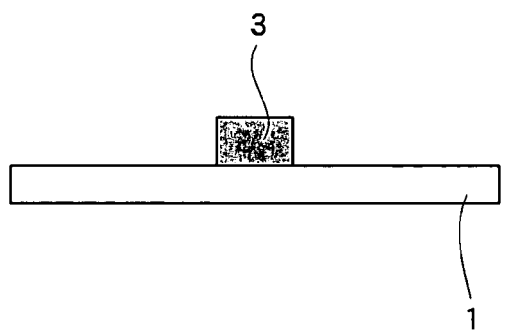
FIG. 2 is a diagram showing one example of a method for manufacturing the fuel cell of FIG. 1.
Figure 2:
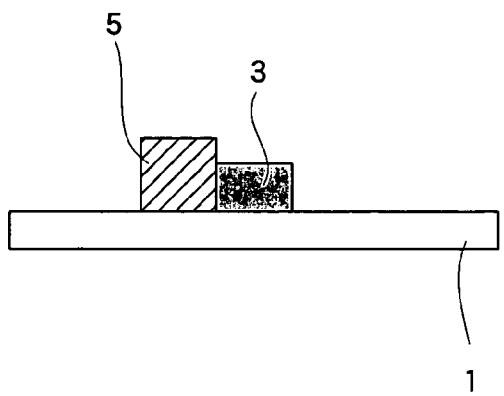
Figure 2:
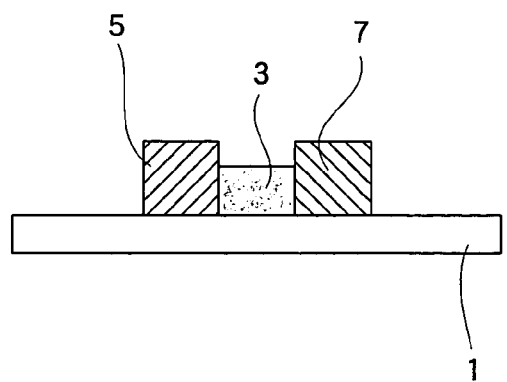

Hereunder, one example of a method for manufacturing the above-mentioned fuel cell is explained with reference to FIG. 2. First, an electrolyte paste, a fuel electrode paste, and an air electrode paste are formed using the above-mentioned powder materials as main ingredients for the electrolyte 3, the fuel electrode 5, and the air electrode 7, respectively, and mixing these pastes with appropriate amounts of varnish, organic solvents, etc. The preferable viscosity of each paste is about $10^3$ to $10^6$ mPa·s.

Second, as shown in FIG. 2(a), the electrolyte 3 is formed by applying the electrolyte paste onto the substrate 1 so as to form a strip-like shape and then drying and sintering it at a predetermined temperature for a predetermined time period. Screen printing is preferable as a method for applying the electrolyte paste; however, roll coating, engraved-roll coating, or lithography may also be employed. Similarly, the fuel electrode 5 is formed by applying the fuel electrode paste onto one side of the electrolyte 3 so as to be adjacent thereto, as shown in FIG. 2(b), and then drying and sintering the paste. Subsequently, the air electrode 7 is formed by applying the air electrode paste so as to be adjacent to the electrolyte 3 on the other side, as shown in FIG. 2(c), and then drying and sintering the paste, thus obtaining a fuel cell as shown in FIG. 1. In consideration of limitations to the methods of applying these pastes, due to the particle sizes of the materials, printing methods, etc., it is preferable that the heights of the electrolyte 3, the fuel electrode 5, and the air electrode 7, as measured from the surface of the substrate 1, be about 5-100 μm. Although not shown in the figure, a current collector is provided to each electrode 5 and 7 to output current.

In a fuel cell having the above-described structure, power is generated in the following manner: A gas mixture of air and fuel gas containing hydrocarbons, such as methane and ethane is supplied to one surface of the single cell C at a high temperature (for example, 400 to 1000° C.). This initiates ionic oxygen conduction in the electrolyte 3 that is sandwiched between the fuel electrode 5 and the air electrode 7, thus generating electric power.

As described above, in the fuel cell of the present embodiment, the single cell C is formed by disposing the electrolyte 3 on the substrate 1 and disposing the fuel electrode 5 and the air electrode 7 on either side of the electrolyte 3, sandwiching the electrolyte 3 between them. This makes it possible to form the single cell C using a minimal amount of unnecessary electrolyte (i.e., unnecessary for a cell reaction), thus improving the cost performance of the fuel cell. Because the electrolyte 3, the fuel electrode 5, and the air electrode 7 are supported by the substrate 1, excellent durability can be maintained. Furthermore, by narrowing the width of the electrolyte 3, high electric power can be obtained. In conventional fuel cells, electric power is generated using ionic conduction only around the surface of the electrolyte; however, in the fuel cell of the present embodiment, because the electrolyte 3 is sandwiched between the fuel electrode 5 and the air electrode 7, ionic conduction inside the electrolyte 3 can be used in addition to that around the surface of the electrolyte 3. This enables the fuel cell to obtain high electric power.

In the fuel cell, the heights of the fuel electrode 3 and the air electrode 5, as measured from the surface of the substrate 1, are greater than that of the electrolyte 3, as measured from the surface of the substrate 1; however, it is also possible to make them the same height or to make the height of the electrolyte 3 greater than the others.

Figure 3:
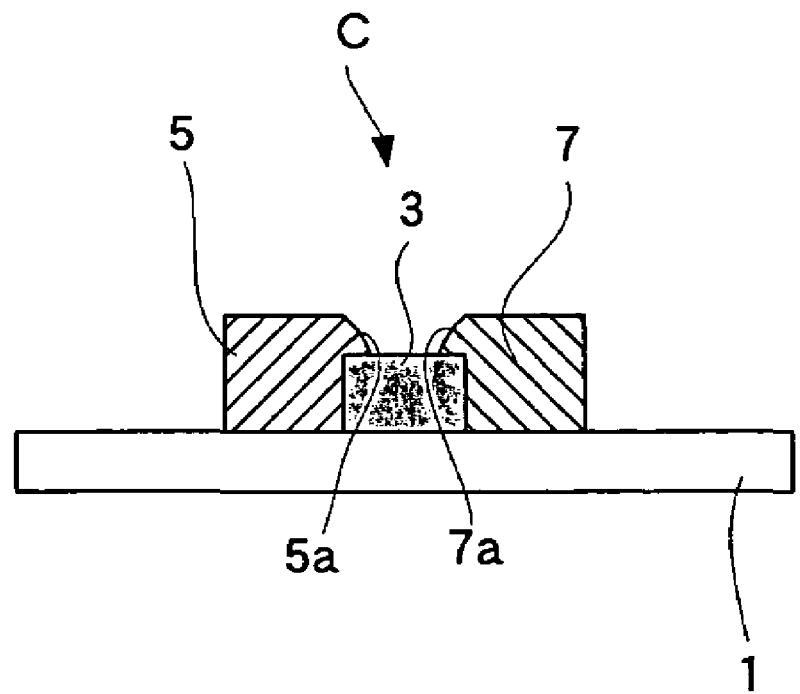
FIG. 3 is a sectional view of another example of the fuel cell of FIG. 1.

When the heights of the fuel electrode 5 and the air electrode 7 are made greater than that of the electrolyte 3 as described above, it is also possible to form the cell so as to have the following structure. As shown in FIG. 3, in this example, portions 5a and 7a of the fuel electrode 5 and the air electrode 7, respectively, are disposed on the electrolyte 3 in such a manner that the 5a and 7a portions are separated from each other. In this structure, because ionic conduction around the surface of the electrolyte 3 is further enhanced by the fuel electrode 5 and the air electrode 7 formed on the electrolyte 3, greater electric power can be obtained.

Figure 4:
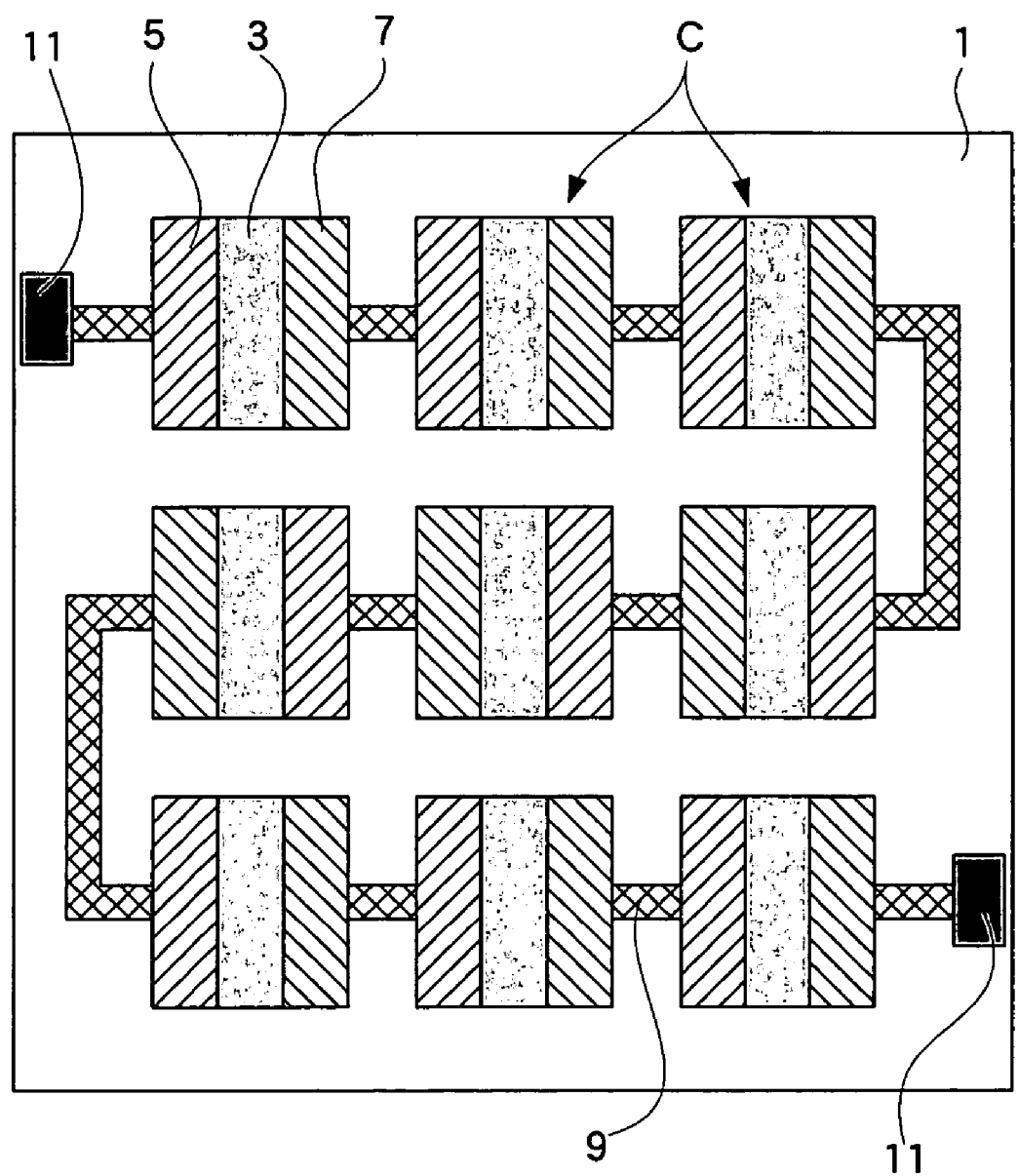
FIG. 4 is a plan view showing one example in which a plurality of fuel cells of the first embodiment are connected in series.

In the above description, a single cell is formed on the substrate 1; however, it is also possible to form a plurality of single cells. FIG. 4 illustrates an example thereof. As shown in this figure, in this example, nine single cells C are connected through interconnectors 9 and two current collector units 11 are formed. One of the current collector units 11 is connected to the fuel electrode 5 of the single cell C disposed on one end of the nine single cells, and the other current collector unit 11 is connected to the air electrode 7 of the single cell C disposed on the other end through the interconnectors 9. The plurality of single cells can be connected in series, in parallel, or in a condition wherein both serial and parallel connections are used. This arrangement makes it possible to obtain a structure having a plurality of cells and to achieve high voltage output.

A method for manufacturing the fuel cell as shown in FIG. 4 is explained below. The materials composing the electrolyte 3, the fuel electrode 5, and the air electrode 7 are the same as described above. The interconnector 9 and the current collector unit 11 can be formed of Pt, Au, Ni, Ag, Cu, SUS, or lanthanum-based materials such as $La(Cr, Mg)O_3$, $(La, Ca)CrO_3$, and $(La, Sr)CrO_3$. These materials can be used alone or in a combination of two or more members. An interconnector paste and a current collector unit paste having a viscosity of about $10^3$-$10^6$ Pa·s are formed by adding additives similar to those used for forming electrolyte paste.

Subsequently, the electrolyte paste is applied by screen printing to nine locations on the substrate 1 so as to form strip-like shapes, and the electrolyte paste is then dried and sintered, thus forming the electrolytes 3. Next, the fuel electrode paste is applied so as to form strip-like shapes to the locations adjacent to one end of each electrolyte 3, and the paste is then dried and sintered, thus forming the fuel electrodes 5. Thereafter, the air electrodes 7 are formed by applying the air electrode paste so as to form strip-like shapes adjacent to the other end of each electrolyte 3, and then drying and sintering the air electrode paste. Nine single cells C are thereby formed on the substrate 1.

Subsequently, the interconnectors 9 are formed by linearly applying the interconnector paste between the single cells C by screen printing in such a manner that the plurality of single cells C are serially connected, and then drying and sintering them. Each interconnector 9 is formed so as to connect the fuel electrode 5 with the air electrode 7 disposed between the electrolytes 3. Furthermore, two interconnectors 9 are formed in such a manner that one extents from the single cell C on one end of the serial connection and the other extends from the single cell C on the other end, and the current collector units 11 are then formed on the ends of the interconnectors 9 by applying the current collector unit paste, and then drying and sintering the paste. By following the above-described process, a fuel cell as shown in FIG. 4 is completed.

SECOND EMBODIMENT

Figure 5:
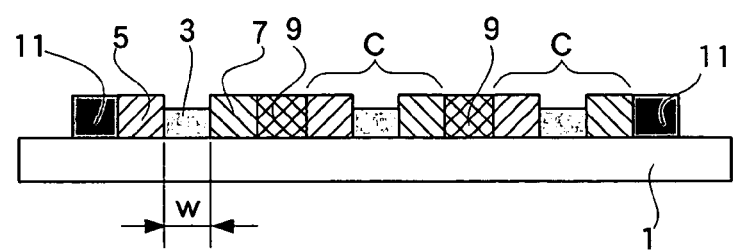
FIG. 5 shows a fuel cell of the second embodiment of the present invention, wherein (a) is a plan view and (b) is a sectional view thereof.
Figure 5:
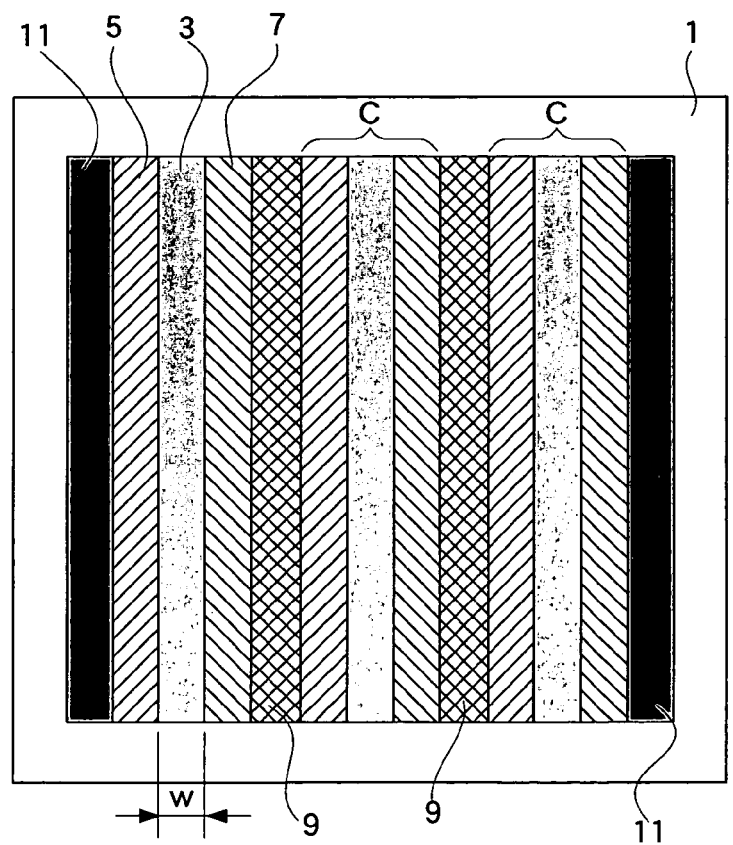

Hereunder, the second embodiment, wherein the fuel cell of the present invention is employed for a solid oxide fuel cell, is explained with reference to the drawings. FIG. 5 shows a fuel cell of the second embodiment of the present invention, wherein (a) is a sectional view and (b) is a plan view thereof.

As shown in FIG. 5, in this fuel cell, a plurality of strip-like electrolytes 3 are disposed on one surface of a substrate 1 spaced substantially equally apart. A strip-like fuel electrode 5 and an air electrode 7 are adjacently disposed so as to sandwich an electrolyte 3 between them. Each single cell C is composed of an electrolyte 3, a fuel electrode 5, and an air electrode 7. A strip-like interconnector 9 is adjacently disposed between each single cell C, i.e., between a fuel electrode 5 and an air electrode 7. Single cells C are serially connected to each other through these interconnectors 9. A strip-like current collector unit 11 is disposed adjacent to the single cells C at both ends of the serial connection in the side opposite to interconnector 9. The lengths of the electrolyte 3, the electrodes 5 and 7, the interconnector 9, and the current collector unit 11 are essentially the same.

The heights and widths W of the substrate 1, the electrolyte 3, the fuel electrode 5, and the air electrode 7 comprising this fuel cell may be the same as in the first embodiment. The substrate 1, the electrolyte 3, the fuel electrode 5, the air electrode 7, the interconnector 9, and the current collector unit 11 may be made of the same materials as described in the first embodiment.

The fuel cell of this embodiment can also be formed by a process similar to that described in the first embodiment. In other words, the strip-like electrolytes 3 are formed on substrate 1 with a regular interval in between, and the fuel electrodes 5 are then formed on one side of each electrolyte 3. Subsequently, the air electrodes 7 are formed on the other side of the each electrolyte 3 to form the single cells C, and the interconnectors 9 are then formed between each single cell C. Finally, the current collector units 11 are formed so as to be adjacent to one of the terminal single cells C. The thus-formed fuel cell generates electricity by being supplied with a mixed gas similar to that used in the first embodiment.

As described above, in a similar manner to the first embodiment, the present embodiment can improve the cost performance of a fuel cell and achieve high electric power.

THIRD EMBODIMENT

Figure 6:
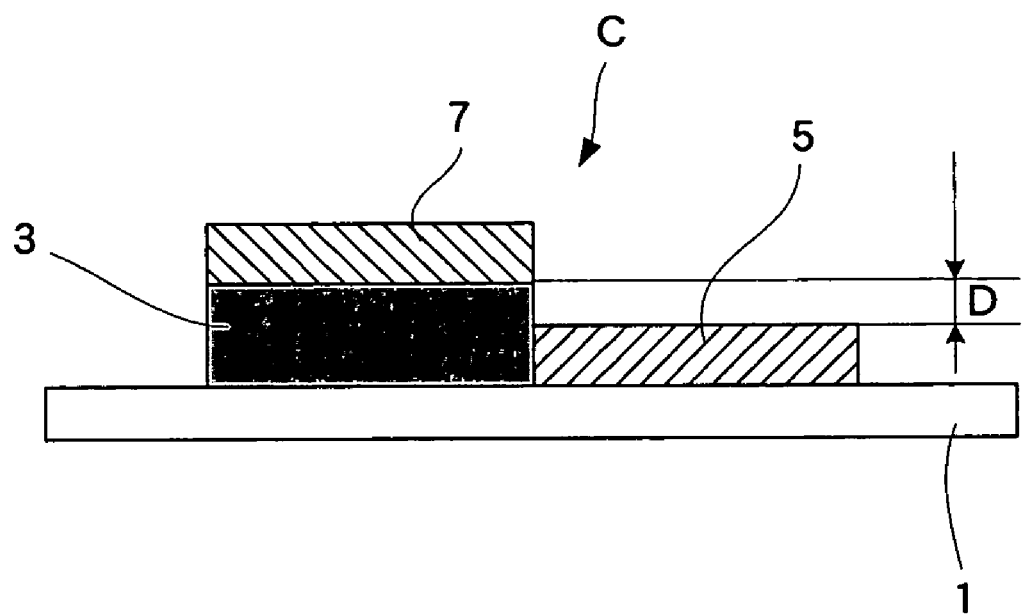
FIG. 6 is a sectional view of a fuel cell of the third embodiment.

The third embodiment, wherein the fuel cell of the present invention is employed for a solid oxide fuel cell, is explained below with reference to drawings. FIG. 6 is a partial sectional view of a fuel cell according to the present embodiment.

As shown in FIG. 6, this fuel cell comprises a single cell C having an electrolyte 3, a fuel electrode 5, and an air electrode 7, wherein the single cell C is supported by a substrate 1.

In the single cell C, the electrolyte 3 is rectangularly formed on top of the substrate 1 (one surface), and the air electrode 7 having essentially the same shape as the electrolyte 3 is formed thereon. The fuel electrode 5 is formed on the substrate 1 adjacent to the electrolyte 3. The fuel electrode 5 is in contact with the side face of the electrolyte 3 and the thickness thereof is less than the electrolyte 3. In other words, the top surface of the fuel electrode 5 is lower than that of the electrolyte 3. Therefore, the fuel electrode 5 and the air electrode 7 are disposed having an interval equal to the difference D in thickness between the electrolyte 3 and the fuel electrode 5. Because the materials for the substrate 1, the electrolyte 3, the fuel electrode 5, and the air electrode 7 comprising this fuel cell are similar to those used in the first embodiment, detailed explanation is omitted.

Figure 7:
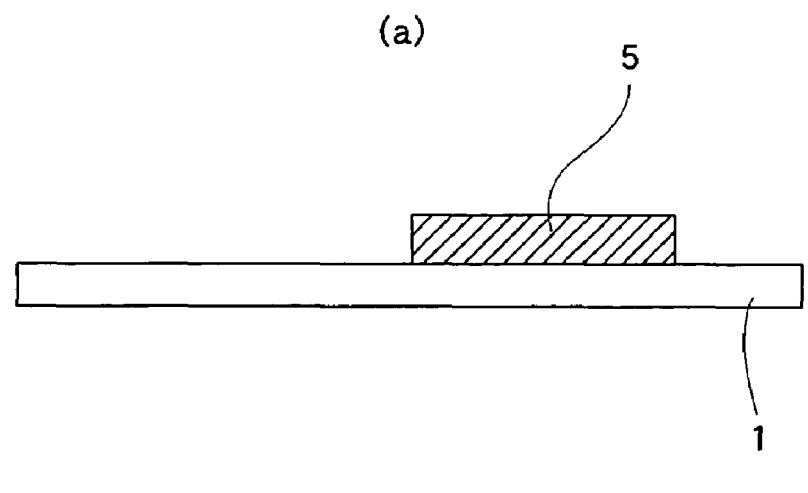
FIG. 7 is a diagram showing one example of a method for manufacturing the fuel cell of FIG. 5.
Figure 7:
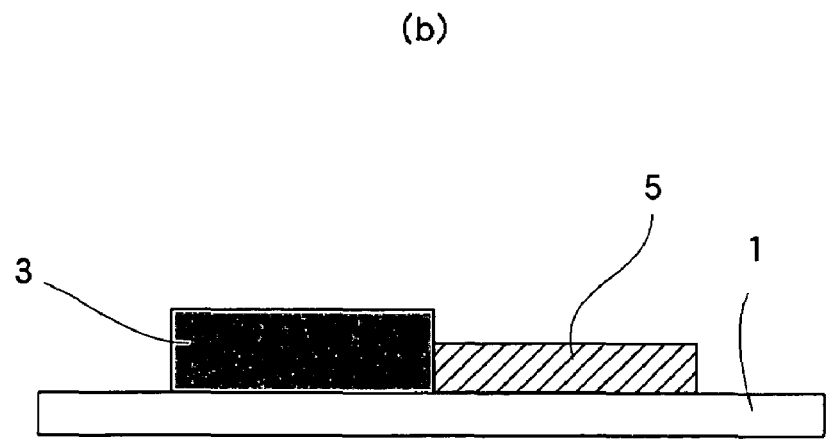
Figure 7:
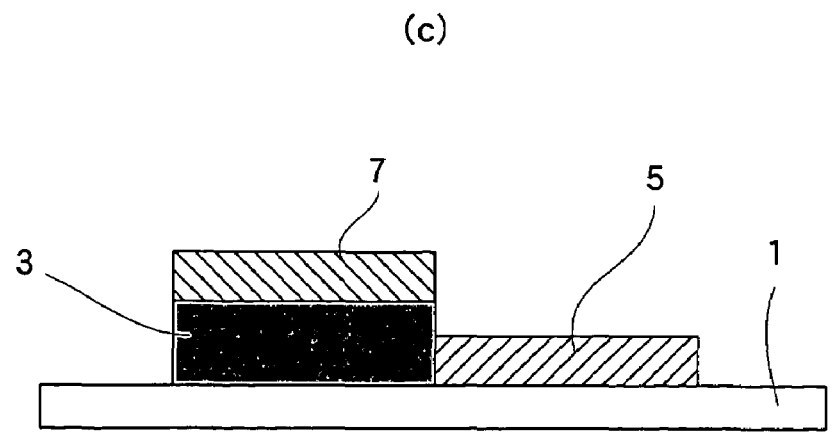

One example of a method for manufacturing this fuel cell is explained below with reference to FIG. 7. Each paste used in this embodiment is prepared in a similar manner to the first embodiment. First, the fuel electrode 5 is formed by applying fuel electrode paste onto the substrate 1 by screen printing so as to be rectangular, and drying it for a predetermined time at a predetermined temperature (FIG. 7(*a*)). Second, electrolyte paste is applied by screen printing so as to be in contact with the side face of the fuel electrode 5 and to have a thickness greater than the fuel electrode 5. By drying and sintering the electrolyte 3 for a predetermined time at a predetermined temperature, the electrolyte 3 and the fuel electrode 5 are formed at the same time (FIG. 7(*b*)). The electrolyte 3 having a height greater than that of the fuel electrode 5 is thereby formed. Subsequently, after applying air electrode paste onto the electrolyte 3 by screen printing, the paste is dried and sintered for a predetermined time at a predetermined temperature, thus forming the air electrode 5 as shown in FIG. 7(*c*). In this process, the air electrode paste is applied so as to have essentially the same area as the electrolyte 3. By following the above process, the fuel cell explained in FIG. 6 can be formed.

In the fuel cell having such a structure, electricity is generated in this manner: a mixed gas of air and a fuel gas containing hydrocarbons, such as methane and ethane is supplied to one surface of the single cell C at a high temperature (for example, 400 to 1000° C.). This initiates ionic oxygen conduction in the electrolyte 3 sandwiched between the fuel electrode 5 and the air electrode 7, generating electric power.

As described above, in this fuel cell, the electrolyte 3 and the fuel electrode 5 are adjacently disposed and the air electrode 7 is disposed on the electrolyte 3. This structure makes it possible to compose a single cell using minimal amount of electrolyte 3 that is unnecessary for a cell reaction compared to conventional structures, thus improving the cost performance.

In this fuel cell, the thickness of the electrolyte 3 is made greater than that of the fuel electrode 5 so that the electrodes 5 and 7 are not in contact with each other. In other words, the difference between the thickness of the electrolyte 3 and that of the fuel electrode 5 becomes the distance between the electrodes 5 and 7. Because the distance between the electrodes 5 and 7 can be controlled simply by adjusting the thickness of the electrolyte 3 or the fuel electrode 5, it is easy to make the electrodes 5 and 7 separate from each other, even when the fuel cell is miniaturized, and therefore fuel cells can be easily manufactured.

Figure 8:
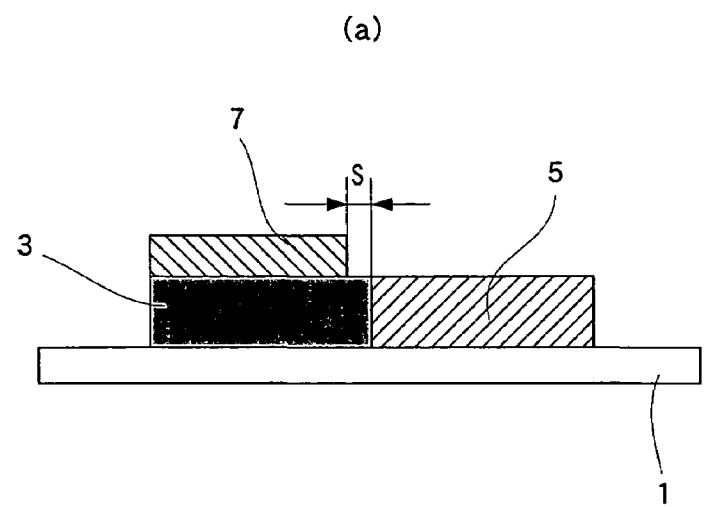
FIG. 8 is a sectional view showing another example of a fuel cell of the third embodiment.
Figure 8:
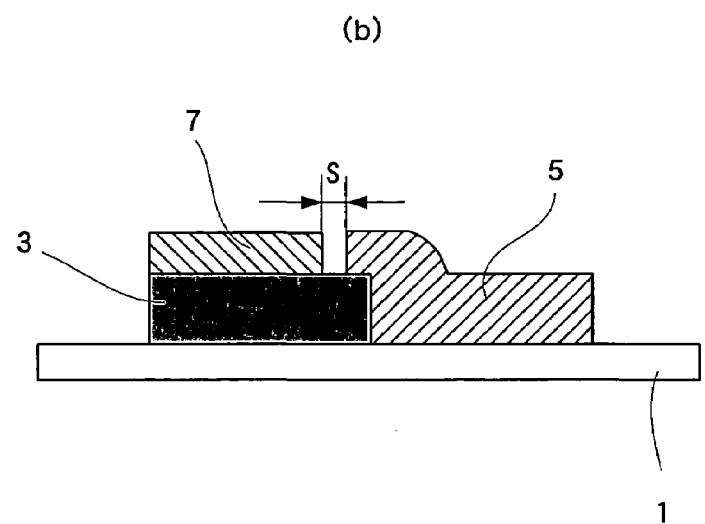
Figure 8:
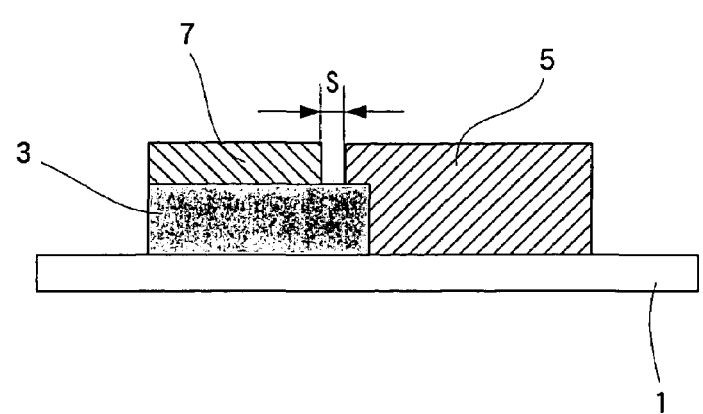

In this embodiment, the electrodes 5 and 7 are separated from each other by making the thickness of the fuel electrode 5 smaller than the electrolyte 3; however, it is also possible to realize a non-contact condition by other means. For example, it is possible to improve the cost performance of a fuel cell even when the thickness of the electrolyte 3 and the fuel electrode 5 are made substantially the same, as long as the air electrode 7 is not applied on the entire top surface of the electrolyte 3 so as to dispose a space S between the air electrode 7 and the fuel electrode 5 as shown in FIG. 8(*a*). As long as the fuel electrode 5 and the air electrode 7 are separated from each other by a space S as shown in FIG. 8(*b*) and FIG. 8(*c*), it is also possible to form a portion of the fuel electrode 5 on top of the electrolyte 3. In other words, it is possible to dispose a portion of the fuel electrode 5 on top of the electrolyte 3 as shown in FIG. 8(*b*), or to make the entire thickness of the fuel electrode 5 greater than the air electrode 7 and dispose a portion of the fuel electrode 5 on the electrolyte 3 as shown in FIG. 8(*c*). Because this structure makes it unnecessary to accurately make the thickness of the electrolyte 3 and the fuel electrode 5 the same as in FIG. 8(*a*), formation of the fuel cell by printing becomes easier.

Figure 9:
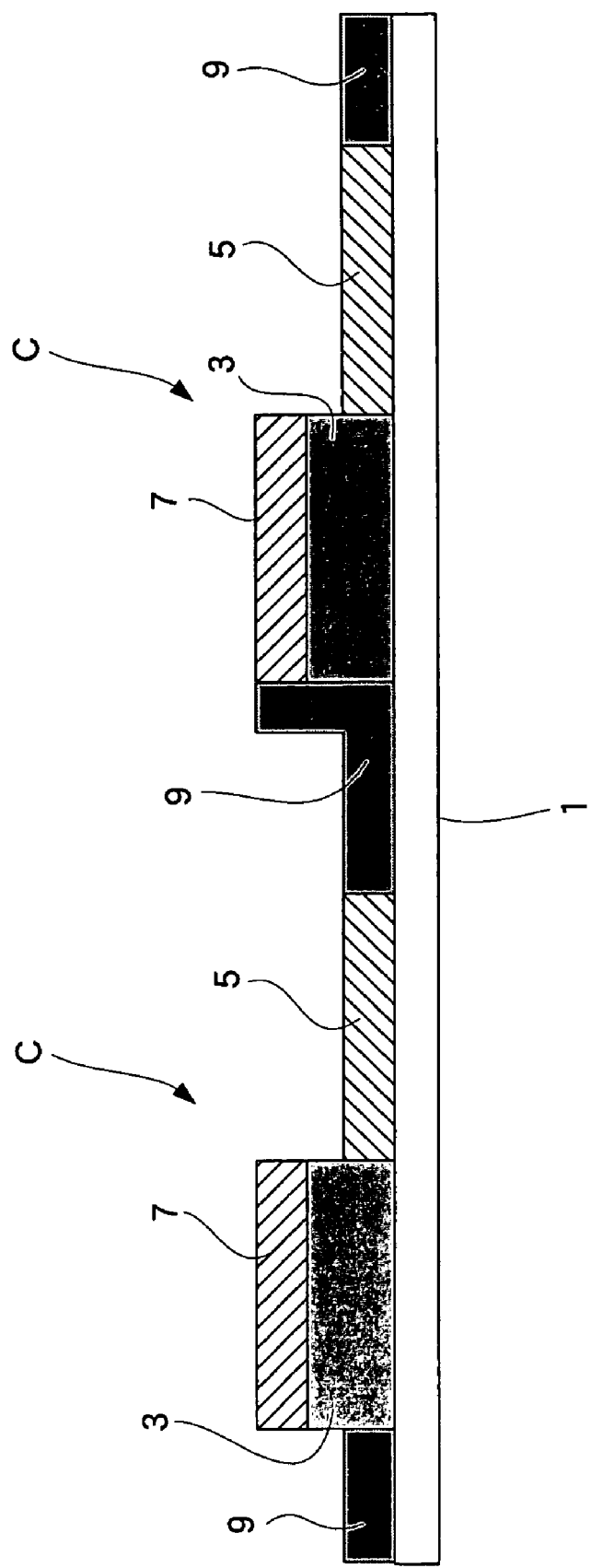
FIG. 9 is a plan view showing one example in which a plurality of fuel cells of the third embodiment are connected in series.

In this embodiment, a fuel cell is formed using a single cell C; however it is also possible to use a plurality of single cells C. In this case, the plurality of single cells are connected to each other by interconnectors. FIG. 9 shows one example thereof. Just two single cells C are shown in this figure; however, it is also possible to use more. Between two single cells C, the air electrode 7 of one single cell C (right side of the figure) is connected to the fuel electrode 5 of the other single cell C (left side of the figure) by an interconnector 9. The materials usable for the interconnector are the same as mentioned in the first embodiment. Both terminal cells are provided with current collector units and current is output from these units (not shown in the figure).

In this embodiment, the air electrode 7 is formed on top of the electrolyte 3 and the fuel electrode 5 is formed adjacent to the electrolyte 3; however, it is also possible to swap the positions of the electrodes 5 and 7 around.

Embodiments of the present invention are explained above; however, the present invention is not limited to these and several variations are possible as long as they do not depart from the scope of the present invention. For example, in the above embodiments, the present invention is employed to a solid oxide fuel cell; however, it is possible to form a fuel cell using materials for a polymer electrolyte fuel cell in addition to the materials described above. Examples of materials for the substrate include polyimide, polyethylene terephthalate, polypropylene, polyethylene, poly paraben acid aramid, polyamide (nylon), polysulfone, polyethersulfone, polyphenylene sulfide, polyether ether ketone, polyether imide, polyarylate, polyethylenenaphthalate and like polymer films. Moreover, it is also possible to use heat-resistant fluororesins, such as ethylene tetrafluoroethylene copolymers (ETFE), tetrafluoroethylene-hexafluoropropylene copolymers (FEP), tetrafluoroperfluoroalkyl vinyl ether copolymers (PFA) and polytetrafluoroethylene (PTFE). Furthermore, the substrates may be formed, in addition to a high polymer films, from art paper, coated paper, light weight coated paper and like coated papers; notebook paper, copy paper and like non-coated papers. It is preferable that the thickness of such a substrate be approximately from 20 µm to 1 mm.

Preferably, the substrate is made from a high polymer film that is inexpensive and readily obtainable. Among such high polymer films, polyethylene terephthalate, polypropylene, polyethylene, etc., are preferable because they are thin and flexible, and polyethylene terephthalate, etc., are particularly preferable from the viewpoint of heat-resistance.

The fuel electrode and air electrode formed on the substrate can be made from a known material that is a mixture of carbon particles supporting a single metal functioning as a catalyst or a catalyst and a hydrogen ion-conductive polyelectrolyte. Examples of catalysts used in the fuel electrode include gold, platinum, platinum compound, etc. Examples of the platinum compounds include alloys of platinum with at least one member selected from the group consisting of ruthenium, palladium, rhodium, nickel, molybdenum, iridium, iron, etc. The catalyst contained in the air electrode is generally platinum, and the catalyst contained in the fuel electrode is generally an alloy of such metals and platinum.

Examples of electrolytes include hydrogen ion-conductive polymers, such as perfluorosulfonic acid-based fluorinated ion exchange resins, more specifically, the perfluorocarbon sulfonic acid polymer (PFS-based polymer) in which C—H links in the hydrocarbon-based ion exchange film are substituted with fluorine. By introducing fluorine atoms, which have a high electronegativity, it is possible to obtain an electrode that is highly chemically stable, having a high degree of sulfonate dissociation, and high ion conductivity. Specific examples of such hydrogen ion-conductive polyelectrolyte include "Nafion" manufactured by DuPont, "Flemion" manufactured by Asahi Glass Co., Ltd., "Aciplex" manufactured by Asahi Kasei Corporation, and "Gore Select" manufactured by WL Gore & Associates, Inc., etc.

The preferable method for forming a fuel electrode or an air electrode on a substrate is such that the carbon particles supporting a catalyst and the hydrogen ion-conductive polyelectrolyte are mixed with an appropriate solvent and made into a paste, and the paste is then applied by a known method in such a manner that the fuel electrode or the air electrode has the desired thickness. The ingredients contained in pastes for the fuel electrode and the air electrode may be the same except for catalysts supported by carbon particles.

Examples of solvents include alcohols, ethers, dialkyl sulfoxides, water and mixture thereof, etc. Among these solvents, alcohols are preferable. Examples of alcohols include methanol, ethanol, n-propanol, isopropanol, n-butanol, tert-butanol and like monohydric alcohols having of 1-4 carbons, polyhydric alcohols, etc.

The method for applying the paste is not limited and knife coating, bar coating, spraying, dip coating, spin coating, roll coating, die coating, curtain coating, screen printing and the like general methods can be employed.

The electrolyte, fuel electrode and air electrode can be formed by applying such pastes and drying. The drying temperature is generally about 40-100° C. and preferably about 60-80° C. The time necessary for drying depends on the temperature; however, it is generally from about 5 minutes to about 2 hours and preferably from about 30 minutes to about 1 hour. The thickness of the fuel electrode or air electrode is generally from about 10 to about 200 µm, preferably from about 10 to about 100 µm, and the most preferably about 15 µm to about 50 µm.

The order of forming the electrolyte, fuel electrode, and air electrode on the substrate is not limited to the above embodiments and can be suitably varied. When a fuel cell is formed using materials for a polymer electrolyte fuel cell, it is possible to simultaneously form two or more members selected from the electrolyte, fuel electrode and air electrode.

When a fuel cell is formed using materials for a polymer electrolyte fuel cell, it is possible to generate electricity by introducing the necessary gas to each electrode under the conditions where, for example, the air electrode and the fuel electrode are completely separated from each other. In other words, hydrogen or a hydrocarbon-based gas is introduced to the fuel electrode and oxygen or air is introduced to the air electrode.

In the above embodiment, single cells are disposed on only one surface of the substrate; however, it is possible to additionally arrange single cells having the same structure on the other face of the substrate as well. This arrangement makes it possible to obtain a high electric power while keeping the fuel cell compact. Furthermore, it is also possible to dispose a plurality of single cells on the other face, in this case, the single cells are connected by interconnectors serially, in parallel, or a combination thereof.

EXAMPLE 1

Hereunder, the present invention is explained in detail with reference to Examples. In Example 1, the way the fuel cell shown in FIG. 5 was manufactured is explained.

SDC[(Ce, Sm)O$_3$] powder (particle size; 0.01-10 µm, average particle size; 0.1 µm) was used as the material for the electrolyte 3 and mixed with cellulose-based varnish to obtain an electrolyte paste. The viscosity of the electrolyte paste was set at $5 \times 10^5$ mPa·s, which is suitable for screen printing. Furthermore, as the material for the fuel electrode 5, a mixture of NiO powder (particle size: 0.01-10 µm, average particle size: 1 µm) and SDC [(Ce, Sm)O$_3$] powder (particle size: 0.01-10 µm, average particle size: 0.1 µm) in a weight ratio of 7:3 was prepared, and the material was then mixed with cellulose-based varnish, giving a fuel electrode paste. The viscosity of the fuel electrode paste was set at $5 \times 10^5$ mPa·s, suitable for screen printing. SSC[(Sm, Sr)CoO$_3$] powder (particle size: 0.1-10 µm, average particle size: 3 µm) was used as the material for air electrode 7 and mixed with cellulose-based varnish to prepare an air electrode paste. The viscosity of the air electrode paste was set at $5 \times 10^5$ mPa·s, suitable for screen printing. Au powder (0.1-5 µm, average particle size: 2.5 µm) was used as the material for the interconnector, and mixed with cellulose-based varnish, giving interconnector paste. The viscosity of the interconnector paste was set at $5 \times 10^5$ mPa·s, suitable for screen printing. The same material for forming an interconnector was prepared for the current collector unit. Substrate 1 was made of an alumina-based substrate, and was of 15 mm square with a thickness of 10 mm.

First, the electrolyte paste was applied onto substrate 1 by screen printing so each strip had a width of 500 µm and thickness of 300 µm, thus forming electrolytes 3. The interval between each electrolyte 3 was set at 1200 µm. The paste was then dried at 130° C. for 15 minutes and sintered at 1600° C. for one hour.

Second, the above fuel electrode paste was applied onto substrate 1 by screen printing so as to have a width of 500 µm and thickness when applied of 500 µm, thus forming the fuel electrodes 5. The fuel electrode paste was then dried at 130° C. for 15 minutes and sintered at 1400° C. for one hour.

Subsequently, the air electrode paste was applied onto substrate 1 by screen printing so as to have a width of 500 µm and application thickness of 500 µm, forming the air electrodes 7. The air electrode paste was then dried at 130° C. for 15 minutes and sintered at 1200° C. for one hour. Three single cells were formed by the above process. Subsequently, interconnector paste was applied between the single cells in such a manner that it had a width of 200 µm and thickness when applied of 500 µm, and the pasted was then dried at 150° C. for 20 minutes. Finally, collector unit paste was applied adjacent to the terminal single cells so as to have a width of 200 µm and thickness when applied of 500 µm. The collector unit paste was dried at 150° C. for 20 minutes and, together with the dried interconnector paste, sintered at 1000° C. for one hour, thus forming the interconnector 9 and the current collector units 11. The length of the electrolyte, the fuel electrode, the air electrode, the interconnector, and the current collector unit was set at 7 mm.

In the same manner, fuel cells 1 comprising electrolytes having widths of 1000 µm and 1500 µm were manufactured. A mixed gas of methane and air was introduced at 800° C. to the three types of the fuel cells 10 in which only the widths of the electrolytes were different, and the voltage-current characteristics thereof were evaluated. The results are shown in Table 1.

TABLE 1

Evaluation of voltage drop at varying current

| Current (mA) | Electrolyte width of 1.5 mm | Electrolyte width of 1.0 mm | Electrolyte width of 0.5 mm |
|---|---|---|---|
| 0.15 mA | ○ | ○ | ○ |
| 15-30 mA | X | Δ | ○ |
| 30-45 mA | X | Δ | ○ |

○: voltage drop was small
Δ: voltage drop was medium
X: voltage drop was great

As shown in Table 1, by narrowing the width of electrolyte, it was possible to reduce the voltage drop when the current was large (15 mA or greater). From these experimental results, it is considered that the preferable width of electrolyte is 1000 μm or less and more preferably 500 μm or less. However, when the width of electrolyte is too narrow, the risk of a short circuit occurring between the fuel electrode and the air electrode is increased, and mass production by printing or the like becomes difficult, and therefore the width of the electrolyte is preferably 1 μm or greater and more preferably 10 μm or greater.

EXAMPLE 2

In Example 2, the fuel cell shown in FIG. 6 was manufactured. $Al_2O_3$ having a thickness of 1 mm was used as the substrate. SDC[(Ce, Sm)$O_3$] powder (0.01-10 μm, average particle size: 5 μm) was used as the electrolyte material and mixed with cellulose-based varnish to prepare an electrolyte paste. The viscosity of the electrolyte paste was set at $5\times10^5$ mPa·s, which is suitable for screen printing. As a material for the fuel electrode, nickel oxide (NiO) powder (particle size: 0.01-10 μm, average particle size: 1 μm) and SDC[(Ce, Sm)$O_3$] powder (particle size: 0.01-10 μm, average particle size: 0.1 μm) were mixed in a weight ratio of 7:3, and cellulose-based varnish was then mixed thereto, giving a fuel electrode paste. The viscosity of the fuel electrode paste was set at $5\times10^5$ mPa·s, suitable for screen printing. SSC[(Sm, Sr)$CoO_3$] powder (0.1-10 μm, average particle size: 3 μm) was used as the material for the air electrode. Cellulose-based varnish was added thereto to form an air electrode paste. The viscosity of the air electrode paste was also set at a viscosity suitable for screen printing, $5\times10^5$ mPa·s.

The electrolyte paste was applied onto the substrate by screen printing so as to cover an area of 520×7000 μm with a thickness of 200 μm, dried at 130° C. for 15 minutes and sintered at 1600° C. for one hour. Subsequently, the fuel electrode paste was applied onto the electrolyte by screen printing so as to have a size of 500×7000 μm and a thickness of 50 μm, and dried at 130° C. for 5 minutes and sintered at 1450° C. for one hour. Subsequently, the air electrode paste was applied so as to be in contact with the side face of the electrolyte, dried at 130° C. for 5 minutes and sintered at 1200° C. for one hour. The air electrode paste was applied so as to have a size of 500×7000 μm and a thickness of 180 μm. A fuel cell having a distance between the fuel electrode and the air electrode of 20 μm was thereby formed.

Figure 10:
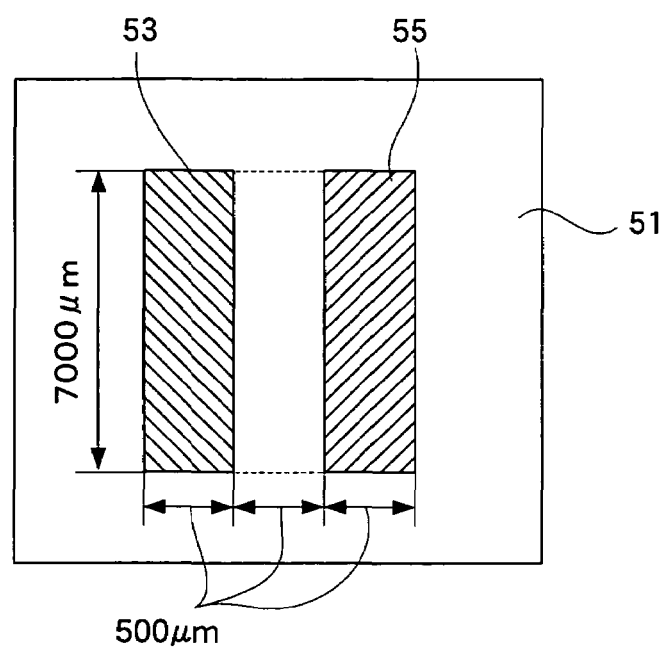
FIG. 10 shows a Comparative Example, wherein (a) is a plan view and (b) is a sectional view thereof.
Figure 10:
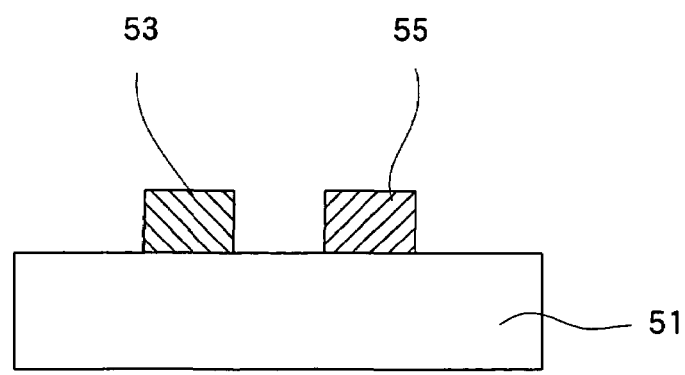

A fuel cell as a Comparative Example was manufactured as follows: As shown in FIG. 10, in this fuel cell, fuel electrode 53 and air electrode 55 were disposed on one surface of electrolyte 51 with a predetermined interval between them. Fuel electrode 53 and air electrode 55 were so formed as to be rectangular, 500×7000 μm, and having a thickness of 50 μm, with the interval between the electrodes 53 and 55 being 500 μm. The materials forming the electrolyte 51, the fuel electrode 53, and the air electrode 55 were the same as those used in Examples 1 and 2.

In the embodiment described in Example 2, it is possible to make the distance between the electrodes small using about two-thirds the electrolyte used in the Comparative Example, therefore the same electric power as the Comparative Example can be obtained at a lower cost.

The invention claimed is:

1. A solid oxide fuel cell comprising at least one first single cell having an electrolyte, a fuel electrode, and an air electrode;
    wherein the fuel cell is provided with a substrate that supports the first single cell;
    the electrolyte is disposed on a first surface of the substrate, and the fuel electrode and the air electrode are disposed on the first surface of the substrate so as to sandwich the electrolyte in a side-by-side configuration on the first surface of the substrate;
    a first side of the electrolyte contacts one side of the fuel electrode, a second side of the electrolyte contacts the first surface of the substrate, a third side of the electrolyte contacts one side of the air electrode, and a fourth side of the electrolyte opposed to the second side of the electrolyte,
    wherein said electrolyte has only a first, second, third and fourth side.

2. A solid oxide fuel cell comprising at least one first single cell having an electrolyte, a fuel electrode, and an air electrode;
    wherein the fuel cell is provided with a substrate that supports the first single cell;
    the electrolyte is disposed on a first surface of the substrate, and the fuel electrode and the air electrode are disposed on the first surface of the substrate so as to sandwich the electrolyte; and
    the heights of both the fuel electrode and the air electrode, as measured from the first surface of the substrate, are greater than a height of the electrolyte, as measured from the surface of the substrate.

3. The solid oxide fuel cell according to claim 2, wherein the fuel electrode and the air electrode are laminated in such a manner that they are separated from each other partially on top of the electrolyte.

4. The solid oxide fuel cell according to claim 1, which further comprises at least one second single cell disposed on a second surface of the substrate and has an electrolyte, a fuel electrode and an air electrode;
    wherein in the second single cell having the electrolyte disposed on the second surface of the substrate, the fuel electrode and the air electrode sandwich the electrolyte.

5. The solid oxide fuel cell according to claim 1, wherein a plurality of single cells are disposed on the substrate, and these first single cells are connected by an interconnector.

6. The solid oxide fuel cell according to claim 1, wherein the width of the electrolyte in the direction sandwiched between the fuel electrode and the air electrode is 10-500 μm.

7. A solid oxide fuel cell comprising at least one first single cell having an electrolyte, a fuel electrode, and an air electrode;
    wherein the fuel cell is provided with a substrate that supports the first single cell;

the electrolyte is disposed on a first surface of the substrate, and one of the fuel electrode and the air electrode is disposed on the electrolyte, and the other of the fuel electrode and the air electrode is not in contact with the electrode disposed on the electrolyte and has at least one portion that is disposed on said first surface of the substrate and is in contact with the electrolyte; and a first side of the electrolyte contacts the other electrode in a side-by-side configuration on the first surface of the substrate, a second side of the electrolyte contacts the first surface of the substrate, a third side of the electrolyte contacts one side of the electrode disposed on the electrolyte, and a fourth side of the electrolyte opposed to the first side of the electrolyte, wherein said electrolyte has only a first, second, third and fourth side.

8. The solid oxide fuel cell according to claim 7, wherein the other electrode is disposed on said first surface of the substrate adjacent to the electrolyte; and the thickness of the electrolyte is greater than that of the other electrode.

9. The solid oxide fuel cell according to claim 7, wherein a plurality of the first single cells are disposed on the substrate, and the plurality of first single cells are connected to each other by an interconnector.

10. The solid oxide fuel cell according to claim 7, wherein the electrolyte, fuel electrode and air electrode are formed by a printing method.

11. The solid oxide fuel cell according to claim 7, which further comprises at least one second single cell having an electrolyte, a fuel electrode, and an air electrode being disposed on a second surface of the substrate;

wherein in the second single cell having the electrolyte disposed on the second surface of the substrate, one of the fuel electrode and air electrode is disposed on the electrolyte, and the other electrode is not in contact with the electrode disposed on the electrolyte and has at least one portion that is disposed on the second surface of the substrate and in contact with the electrolyte.

12. The solid oxide fuel cell according to claim 7, wherein the heights of the other electrode, as measured from the first surface of the substrate, are greater than a height of the electrolyte, as measured from the surface of the substrate.

13. The solid oxide fuel cell according to claim 12, wherein a part of the other electrode is disposed on the top of the electrolyte.

* * * * *